I. E. BEAMISH.
POWER PLOWING MACHINE.
APPLICATION FILED MAR. 24, 1914.
1,170,394.
Patented Feb. 1, 1916.
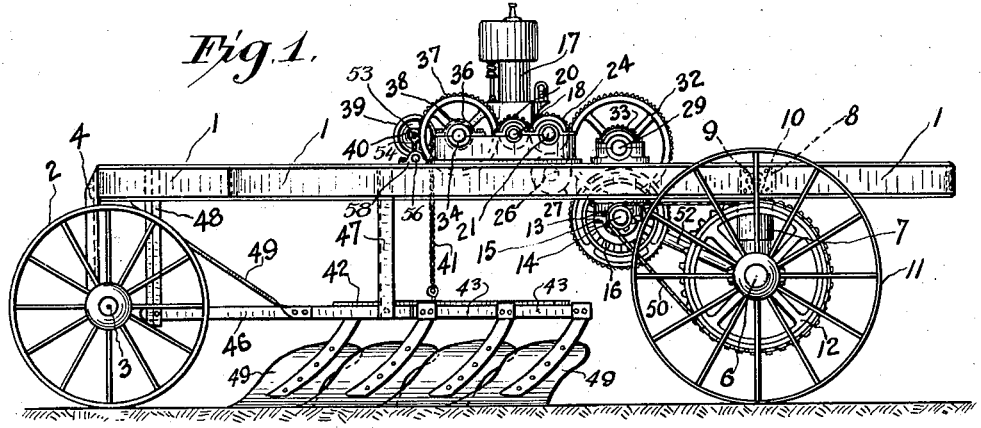
WITNESSES.
Margaret Taylor.
Blanche Whitehead.
INVENTOR.
IMER EMERSON BEAMISH.
BY Fred B. Featherstonhaugh
ATT'Y.

UNITED STATES PATENT OFFICE.

IMER EMERSON BEAMISH, OF NORTH VANCOUVER, BRITISH COLUMBIA, CANADA, ASSIGNOR OF ONE-HALF TO BYRON C. BEAMISH, OF NORTH VANCOUVER, BRITISH COLUMBIA, CANADA.

POWER PLOWING-MACHINE.

1,170,394.   Specification of Letters Patent.   Patented Feb. 1, 1916.

Application filed March 24, 1914. Serial No. 826,838.

*To all whom it may concern:*

Be it known that I, IMER EMERSON BEAMISH, a subject of the King of Great Britain, and a resident of the city of North Vancouver, in the Province of British Columbia, Canada, have invented certain new and useful Improvements in Power Plowing-Machines, of which the following is a specification.

My invention relates to improvements in power plowing machines, and the object of my invention is to devise a plowing machine so arranged that it will pack the ground as it plows it, thereby doing away with the necessity of drawing a special machine behind the plow to pack the newly plowed ground, as is required at the present time.

A further object is to devise a plowing machine in which, by the simple and compact arrangement of parts, it is possible to reduce the excessive length common to such plowing machines at the present time to a minimum, so that by its use it is possible to plow right up to the end of a field, or right up to a bluff or other obstruction, which cannot be done by the plowing machines in present use, a disadvantage which renders them practically useless for small farms, on account of the large amount of ground left at each end of the field which cannot be plowed on account of their excessive length and consequent difficulty of turning within a small radius.

A still further object is to devise a plowing machine in which the operator will always have an unobstructed view ahead of the plows and furrows, thereby making it possible for one man to handle the machine easily, both as regards the looking after the driving machinery and also the plows, instead of, as in the plowing machines in use at present, two men being required, one to look after the plows and one to guide the machine.

I attain these objects by the means illustrated in the accompanying drawings, in which—

Figure 1 is a side elevation of my machine. Fig. 2 is a plan view of my machine.

Similar figures of reference indicate similar parts throughout the several views.

1 represents the frame of my plowing machine, formed preferably of steel sections, and arranged after the manner shown more particularly in Fig. 2.

2 are the front wheels, carried by the front axle 3, which is secured to the front part of the frame 1 by any approved mechanical means, such as the angle members 4.

5 is the main traction wheel, which is located between the side members of the frame 1, and occupies practically the whole width therebetween with the exception of the space required by the gearing, hereinafter mentioned. This main traction wheel, 5, is made up preferably of two wheels of equal diameter and width, to facilitate easy turning of the machine, and is supported on the rear axle, 6, which runs in the spring bearings, 7, which bearings may be of any suitable type. The rear axle 6 is extended outwardly to carry the side traction wheel 11.

12 are the driven sprockets, which are rigidly secured to the rear axle in the position shown, that is, one sprocket is positioned inside the frame 1 between one side member of the frame and the main traction wheel, while the other is positioned outside the frame between the other side member of the frame and the side traction wheel, all as shown more particularly in Fig. 2.

13 are the driving sprockets, rigidly secured to the shaft 14, which extends across the frame 1 and is rotatably supported thereon in the brackets 15, which brackets are secured to the side members of the frame on the lower side thereof. The driving sprockets 13 are in alinement with the driven sprockets 12, driving connection being made therebetween by any type of chain drive suitable for the purpose.

16 is a differential gear of the ordinary type from which gear the shaft 14 receives its motion.

17 is an internal combustion engine of any suitable make, and which is carried on the frame 1, as shown in Figs. 1 and 2. The main shaft 18 of the engine 17 is extended to be supported in the bearing 19, and carries the pinion 20.

21 is a counter shaft supported in the bearings 22 and 23, and having thereon the fixed pinion 24 which gears with the engine shaft pinion 20, and the loose pinion 25, which gears with the gear wheel 32, hereinafter mentioned. This pinion 25 is free on the shaft 21, and is always in gear with the wheel 32, but it is adapted to be engaged by a suitable friction or other form of clutch rotatable with the shaft so that it may become a fixed pinion, as required.

26 is a counter shaft suitably supported on the frame 1 directly underneath the shaft 21, and having thereon the fixed pinion 27 which gears with the fixed pinion 24 of the shaft 21, and the loose pinion 28 which gears with the gear wheel 32, similarly to the loose pinion 25. This pinion 28 is free on the shaft 26, and is always in gear with the wheel 32, but it, like the pinion 25, is adapted to be engaged by a suitable clutch rotatable with the shaft 26 so that it may become a fixed pinion, as required, and it may be here mentioned that the same clutch lever arranged may be used for both pinions 25 and 28, so that one movement of the lever will make 25 a fixed, and 28 a loose pinion, and vice versa.

29 is a counter shaft suitably supported on the frame 1 in the bearings 30 and 31, directly above the shaft 14, hereinbefore mentioned, and having rigidly secured thereon the gear wheel 32, which is rotated by the pinions 25 and 28, according as they are made fixed pinions alternately, as hereinbefore described.

33 is a pinion secured to the shaft 29 and which gears with the differential gear 16 on the shaft 14.

From the foregoing arrangement of gearing it will be seen that the machine is adapted to move either forward or backward, with equal facility, these movements being obtained by simply moving the clutches hereinbefore mentioned alternately into or out of engagement with their respective pinions, 25 and 28, as required. The forward drive is obtained as follows:—The clutch on the shaft 21 is moved into engagement with the loose pinion 25, thus making it for the time being a fixed pinion. This action disengages the clutch on shaft 26 from the pinion 28, since the same lever is used for both clutches, allowing the pinion 28 to run free on the shaft. The engine is now started and running in the designed direction, causes the several shafts to be rotated, the engine shaft pinion 20 rotating the pinion 24 which rotates the counter shaft 21 and the pinion 25. The pinion 25, which is now temporarily a fixed pinion, in turn rotates the gear 32, which rotates the shaft 29 and the pinion 33, which pinion 33 in turn rotates the differential gear 16 and the shaft 14, this shaft in turn causing the main traction wheel 5 and side traction wheel 11 to revolve by means of the sprockets 13 and 12, and the chains 50, and thus move the machine forward. It will be noted that while the machinery above mentioned is in motion, the counter shaft 26 is also rotated by means of the fixed pinion 24, which gears with the fixed pinion 27, but that this counter shaft 26 is rotating in the opposite direction to the counter shaft 21. Therefore if the clutch on shaft 26 be moved into engagement with the pinion 28, making it for the time being a fixed pinion rotating with shaft 26, and at the same time disengaging the clutch on shaft 21 from the pinion 25, thus changing it from a fixed pinion to a loose one, the pinion 28 will rotate the gear 32 in the opposite direction to that already described, so that a reverse motion will be obtained which will reverse the rotation of the shafts 29 and 14 and cause the machine to move backward.

34 is a counter shaft suitably supported on the frame 1 in the bearings 35 and 36, and having rigidly secured thereon the gear 37 which gears with the engine shaft pinion 20, whereby the shaft 34 is rotated when the engine is running.

38 is a friction pulley secured on the shaft 34.

39 is a friction pulley rotatably carried by the shaft 53, which shaft is secured into and carried by the upper ends of the arms 54 and 55. The lower ends of these arms are secured to the shaft 56, which is rotatably supported on the frame 1 in suitable bearings 57 and 58.

59 is a lever secured to shaft 56, by means of which the shaft 56 and the arms 54 and 55 secured thereto may be moved in either direction so as to carry the friction pulley 39 into or out of frictional engagement with the pulley 38.

40 is a chain pulley secured to the side of the friction pulley 39.

41 is a chain, one end of which is attached to the chain pulley 40 while the other end is attached to the bar 42, which extends across the plow beams 43, and is attached freely thereto by means of suitable links.

These plow beams 43 are secured at the ends remote from the plow shares 49 in a swivel manner on the pins 44, which pins are carried by the castings 45, these castings being firmly secured at specified positions to the draw bar 46. The plow beams 43 are arranged in this manner so that they will be easily controlled by the operator, as it will be seen, on reference to the paragraph immediately preceding, and the drawings, that the plow beams may be raised or lowered according as the friction pulley 39 is swung into or out of engagement with the friction pulley 38 carried by the shaft 34.

The draw bar 46 is secured to the frame 1 in the required position as to height by any approved means, such as by the angle members 47 and 48 and braced by the member 49; its designed transverse position being such that when the complete machine is assembled and in operation, the traction wheel 5 will run on the furrows cut by the plow-shares 49, secured to the plow beams 43, which beams are carried by the draw bar 46 as hereinbefore described. The plow shares 49 may be of any suitable type and are secured to the beams 43 by any approved means.

51 is a belt pulley which may be carried on the shaft 34 for threshing or other purposes, when the engine of the machine is used for the generation of power for such purposes, but this pulley 51 would not be ordinarily carried when plowing.

52 are braces adapted to extend between the shaft 14 and the rear axle 6 to hold the rear axle in position.

The cooling and fuel tanks, with radiator, for the engine, are placed on the forward part of the frame 1, but as these are of any suitable type and admit of various arrangements it is not deemed necessary to illustrate them. The driver's seat is located preferably above the main traction wheel 5 and toward the right hand side of the machine, the steering wheel and various operating levers being positioned within his control.

It will be seen, therefore, that I have devised a plowing machine which will pack the ground as it plows it, thus doing away with the extra machine required at the present time to pack the newly plowed ground, and which is drawn behind the plows. It will also be seen that I have devised a plowing machine which is adapted to turn within a much smaller radius than is possible with the present types of machines on account of their excessive length, thereby providing a machine by means of which the ground may be plowed right up to the end of the field, which cannot be done at the present time. It will be seen still further that I have devised a plowing machine which is adapted to be easily handled by one operator, instead of two, as required at present, and in which the operator has at all times an unobstructed view ahead of the plows and furrows, thus enabling him to control both the plowing means and the driving gear of the machine without assistance.

What I claim as my invention is:

1. A plowing machine comprising, a main frame, plowshares carried thereby, a pair of wheels supporting the front end of said frame, a rear axle one end of which extends outwardly from the frame, a pair of cylindrical rollers mounted end to end on said axle and positioned so that their peripheries roll on the ridges of the furrows formed by said plowshares, a land traction wheel mounted on the outwardly extending portion of the rear axle, a motor mounted on the frame, a driving shaft supported on the frame, a driving connection between the driving shaft and the rear axle, a pinion on the motor shaft, a differential gear for the driving shaft, and a gear connection between said pinion and said differential gear, said gear connection being adapted to reverse the direction of rotation of the said differential gear and said driving shaft irrespective of the direction of rotation of the said pinion.

2. A plowing machine comprising, a main frame, plow shares carried thereby, a pair of wheels supporting the front end of said frame, a rear axle one end of which extends outwardly from the frame, a cylindrical roller mounted on said axle within the frame and positioned so that its periphery rolls on the ridges of the furrows formed by the said plowshares, a land traction wheel mounted on the outwardly extending portion of the rear axle, a motor mounted on the frame, a driving shaft supported on the frame, a driving connection between the said driving shaft and the rear axle, a differential gear on the driving shaft, an intermediate shaft in gear connection with the said differential gear, a pair of intermediate shafts gear connected with each other and with the motor shaft, a loose gear on each of the last mentioned intermediate shafts, each said loose gear being in engagement with a gear on the first mentioned intermediate shaft, and manually operated clutch means for each loose gear adapted to engage alternately therewith whereby each loose gear becomes alternately a fixed gear.

Dated at Vancouver, B. C. this twenty-first day of February, 1914.

IMER EMERSON BEAMISH.

Witnesses:
  JAMES TAYLOR,
  J. D. McPHEE.